(12) United States Patent
Raghu et al.

(10) Patent No.: US 10,117,267 B2
(45) Date of Patent: Oct. 30, 2018

(54) SCHEDULER FOR POWER-EFFICIENT TIME SLOTTED PROTOCOL

(71) Applicant: TEXAS INSTRUMENTS INCOPORATED, Dallas, TX (US)

(72) Inventors: Arvind K. Raghu, Plano, TX (US); Ariton E. Xhafa, Plano, TX (US); Ramanuja Vedantham, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/816,512

(22) Filed: Aug. 3, 2015

(65) Prior Publication Data

US 2016/0174192 A1 Jun. 16, 2016

Related U.S. Application Data

(60) Provisional application No. 62/090,704, filed on Dec. 11, 2014.

(51) Int. Cl.
*H04W 72/12* (2009.01)

(52) U.S. Cl.
CPC .... *H04W 72/1289* (2013.01); *H04W 72/1273* (2013.01); *Y02D 70/00* (2018.01)

(58) Field of Classification Search
CPC ......... H04W 72/1289; H04W 72/1205; H04W 72/12; H04W 72/1273; H04W 72/1263
USPC ................. 370/329, 311, 431, 337, 449, 350
See application file for complete search history.

(56) References Cited

U.S. PATENT DOCUMENTS

| | | | | |
|---|---|---|---|---|
| 8,767,743 | B2* | 7/2014 | Patel | H04B 13/005 370/395.4 |
| 2004/0253996 | A1* | 12/2004 | Chen | H04W 52/0216 455/574 |
| 2005/0030927 | A1* | 2/2005 | Mucke | H04L 5/023 370/336 |
| 2006/0159118 | A1* | 7/2006 | Shvodian | H04L 12/403 370/449 |
| 2007/0135130 | A1* | 6/2007 | Lee | H04W 72/1289 455/450 |
| 2009/0046675 | A1* | 2/2009 | Pratt, Jr. | H04W 84/18 370/337 |

(Continued)

OTHER PUBLICATIONS

Yu-Chee, et al. "Power-Saving Protocols for IEEE 802.11—Based Multi-Hop Ad Hoc Networks," IEEE Infocom 2002 (pp. 200-209).

(Continued)

*Primary Examiner* — Kwang B Yao
*Assistant Examiner* — Syed M Bokhari
(74) *Attorney, Agent, or Firm* — Kenneth Liu; Charles A. Brill; Frank D. Cimino

(57) ABSTRACT

A network includes a parent node and at least one child node that is configured to communicate with the parent node via a wireless network protocol. The parent node includes a broadcast coordinator to transmit a broadcast message from the parent node to the child node at predetermined time intervals according to the wireless network protocol. A scheduler generates a scheduling packet that is communicated in the broadcast message. The scheduling packet includes a data field to instruct each child node to activate and receive data communicated from the parent node in a prescribed time slot following the broadcast message that is defined by the scheduling packet.

20 Claims, 4 Drawing Sheets

(56) References Cited

U.S. PATENT DOCUMENTS

2014/0161010 A1* 6/2014 Merlin .............. H04W 52/0235
                                                    370/311
2015/0327261 A1* 11/2015 Thubert ................ H04W 40/22
                                                    370/336
2016/0119810 A1* 4/2016 Merlin .............. H04W 28/0231
                                                    370/311

OTHER PUBLICATIONS

Part 15.4: Low-Rate Wireless Personal Area Networks (LR-WPANs), Amendment 1: MAC sublayer, IEEE Standard for Local and metropolitan area networks, IEEE Computer Society, LAN/MAN Standards Committee, IEEE Std 802.15.4eTM-2012, (Amendment to IEEE Std 802.15.4TM-2011)Apr. 16, 2012 (224 pages).

* cited by examiner

SCHEDULER FOR POWER-EFFICIENT TIME SLOTTED PROTOCOL

CROSS-REFERENCE TO RELATED APPLICATION

This application claims the benefit of U.S. Provisional Patent Application 62/090,704 filed on Dec. 11, 2014, and entitled A COORDINATED BIT-MAPPED DYNAMIC SCHEDULER FOR POWER-EFFICIENT TIME SLOTTED MAC PROTOCOL OPERATION, the entirety of which is incorporated by reference herein.

TECHNICAL FIELD

This disclosure relates to networks, and more particularly to a scheduler for a power-efficient time slotted protocol.

BACKGROUND

Network time slotted protocols are widely used to establish communications between network nodes utilizing a predictable time frame slotting technique for nodes to communicate, where each network node communicates according to predefined slots. Such protocols provide scheduled, contention-free channel access to improve throughput performance compared to carrier sense techniques. The main drawbacks of time-slotted mechanisms are tight time synchronization related overheads and static centralized scheduling. Prescheduled time-slots can be under-utilized (e.g., unused) especially under low-traffic conditions. The unused time-slots can be even more expensive from a power consumption point of view in low-power networked systems where devices automatically wakeup to listen for data and are in an active state to receive data when in fact there is often no data to receive. Also, the pre-assignment of time slots in each communication frame is most often performed in a centralized manner and thereby unable to change depending on the bandwidth requirements of nodes in a multi-hop network topology, for example.

SUMMARY

This disclosure relates to a scheduler for a power-efficient time slotted protocol.

In one example, a network includes a parent node and at least one child node that is configured to communicate with the parent node via a wireless network protocol. The parent node includes a broadcast coordinator to transmit a broadcast message from the parent node to the child node at predetermined time intervals according to the wireless network protocol. A scheduler generates a scheduling packet that is communicated in the broadcast message. The scheduling packet includes a data field to instruct each child node to activate and receive data communicated from the parent node in a prescribed time slot following the broadcast message that is defined by the scheduling packet.

In another example, a method includes transmitting a broadcast message from a parent node to at least one child node at predetermined time intervals according to a wireless network protocol. The method includes generating a scheduling packet that includes a map to instruct each child node to activate and receive data communicated from the parent node in a prescribed time slot following the broadcast message that is defined by the scheduling packet. The method includes communicating the scheduling packet with the broadcast message to update each child node according to instructions specified in the map.

In yet another example, a system includes a parent node and at least one child node that is configured to communicate with the parent node via a wireless network protocol. The parent node includes a broadcast coordinator to transmit a broadcast message from the parent node to the child node at predetermined time intervals according to the wireless network protocol. A scheduler generates a scheduling packet that is communicated in the broadcast message. The scheduling packet includes a map to instruct each child node to activate and receive data communicated from the parent node in a prescribed time slot following the broadcast message that is defined by the scheduling packet. The scheduling packet includes at least one virtual node identifier to identify the child node within the map. The virtual node identifier is assigned to the child node by the parent node when the child node joins the network.

DETAILED DESCRIPTION

This disclosure relates to a scheduler for a power-efficient time slotted protocol. A system and network are provided that provide communications between a parent node and at least one child node that is configured to communicate with the parent node via a wireless network protocol such as a time slotted wireless communications protocol, for example. The parent node includes a broadcast coordinator to transmit a broadcast message (e.g., a beacon) from the parent node to the child node at predetermined time intervals where each child node can synchronize network operations according to the broadcast message. A scheduler in the parent node generates a scheduling packet that is communicated in the broadcast packet. The scheduling packet includes a data field such as a map to instruct each child node to activate and receive data communicated from the parent node in a prescribed time slot following the broadcast message. The scheduler can dynamically change the map over time according to routing requirements for each child node. For instance, if the parent node has no data to communicate to the child node in either a receive or shared time slot of the child node, the map can be set such that the child node turns off its respective receiver during the slot specified in the map thus conserving power in the child at such times.

The scheduler can also communicate mode changes to the child via the respective map where the mode changes indicate other types of time slotting such as consecutive time slotting, channel hopping options or high bandwidth periods to communicate between parent and child node. For example, a normal mode of operation in a typical sensor network deployment consists of sensor data being sent in up-link traffic. However, when the network devices need to be reprogrammed via over-the-air-programming (OTP), this mode of operation can require large amounts of contiguous down-link traffic. Thus, the OTP mode may need a different network scheduling pattern which can be specified in the map. The child can also send an indication to the parent via a message packet to indicate that the child has data to transmit to the parent at a predetermined slot and frame in the future.

Figure 1:
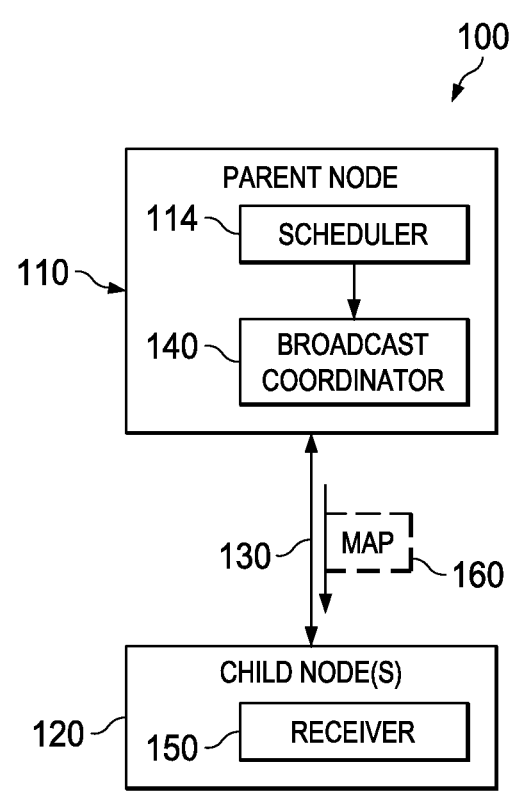
FIG. 1 illustrates an example network that includes a parent node that employs a scheduler to control power consumption of a child node.

FIG. 1 illustrates an example network 100 that includes a parent node 110 that employs a scheduler 114 to control power consumption of a child node 120. In this example, the network 100 includes at least two nodes that employ a routing protocol to communicate across a wireless network connection 130. In other examples, more than one child node 120 may be employed. Also, intermediate nodes (See e.g. FIG. 7) may exist between the parent node 110 and the child node 120, where the intermediate nodes become the parent nodes for the lower-level child nodes.

The parent node 110 includes a broadcast coordinator 140 to transmit a broadcast message from the parent node to the child node 120 at predetermined time intervals according to the wireless network protocol. The scheduler 114 generates a scheduling packet that is communicated in the broadcast message. The scheduling packet includes a data field to instruct each child node 120 to activate a receiver 150 and receive data communicated from the parent node 110 via the receiver in a prescribed time slot following the broadcast message and defined by the scheduling packet. The scheduling packet can be embedded or encoded within the broadcast message or can be concatenated along with the broadcast message however the scheduling packet is transmitted within the time slot allocated for the broadcast message. The wireless network protocol can be any time division multiple access protocol (TDMA), such as a time slotted channel hopping (TSCH) protocol specified according to IEEE 801.15.4e, for example. Thus, the broadcast message can be implemented depending on the wireless network protocol that is implemented in the network 100.

By way of example, the broadcast message can be a beacon that is periodically transmitted by the broadcast coordinator 140 of the parent node 110 as a synchronization phase for a subsequent data transmission phase, for example. The data field of the scheduling packet can include at least one virtual node identifier to identify the child node 120 within a map 160 of child nodes. The virtual node identifier can be assigned to the child node 120 by the parent node 110 when the child node joins the network 100. The map 160 includes one or more of a receive map, a shared map or a mode map. The map can be a map of bits in one example or can be more complex data representations such as data structures, strings, labels, fields, and so forth that enable or disable receive functionality within the child node 120 (or nodes) as described herein. The receive map includes instructions to enable or disable a receive time slot in at least one of the child nodes 120. The shared map includes instructions to enable or disable a shared time slot in at least one of the child nodes. The mode map includes instructions to enable or disable a selected mode of operation in at least one of the child nodes.

As used herein, the term time slot refers to a designated period of time in a communications frame where a given node can receive or transmit data, where a frame is a basic unit of data transport that includes a set of contiguous time-slots transmitted according to a fixed schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective child node 120.

To overcome the drawbacks of always forcing the receiver 150 of the child node 120 to be active to receive data during each frame as in conventional systems, the map 160 can be employed to indicate the mode of operation of the child node as well as the nodes that need to be switched on to receive packets. In this manner, when the parent node 110 does not have any data for the child node to receive, the receiver 150 can be disabled via the map 160 thus conserving power in the child node 120. The map 160 can be coordinated for up-link and down-link traffic before the decision to turn on or off a specific slot is taken by the child node 120, where up-link refers to data being transmitted from child-to-parent and downlink refers to data being transmitted from parent-to-child. The map 160 can be transmitted along with a beacon that is usually sent every frame in time slotted protocols or in any other broadcast message that is periodically sent at a rate that should be at least higher than the desired response-time of a mode switch for the child node 120 as described below with respect to FIG. 2.

Figure 2:
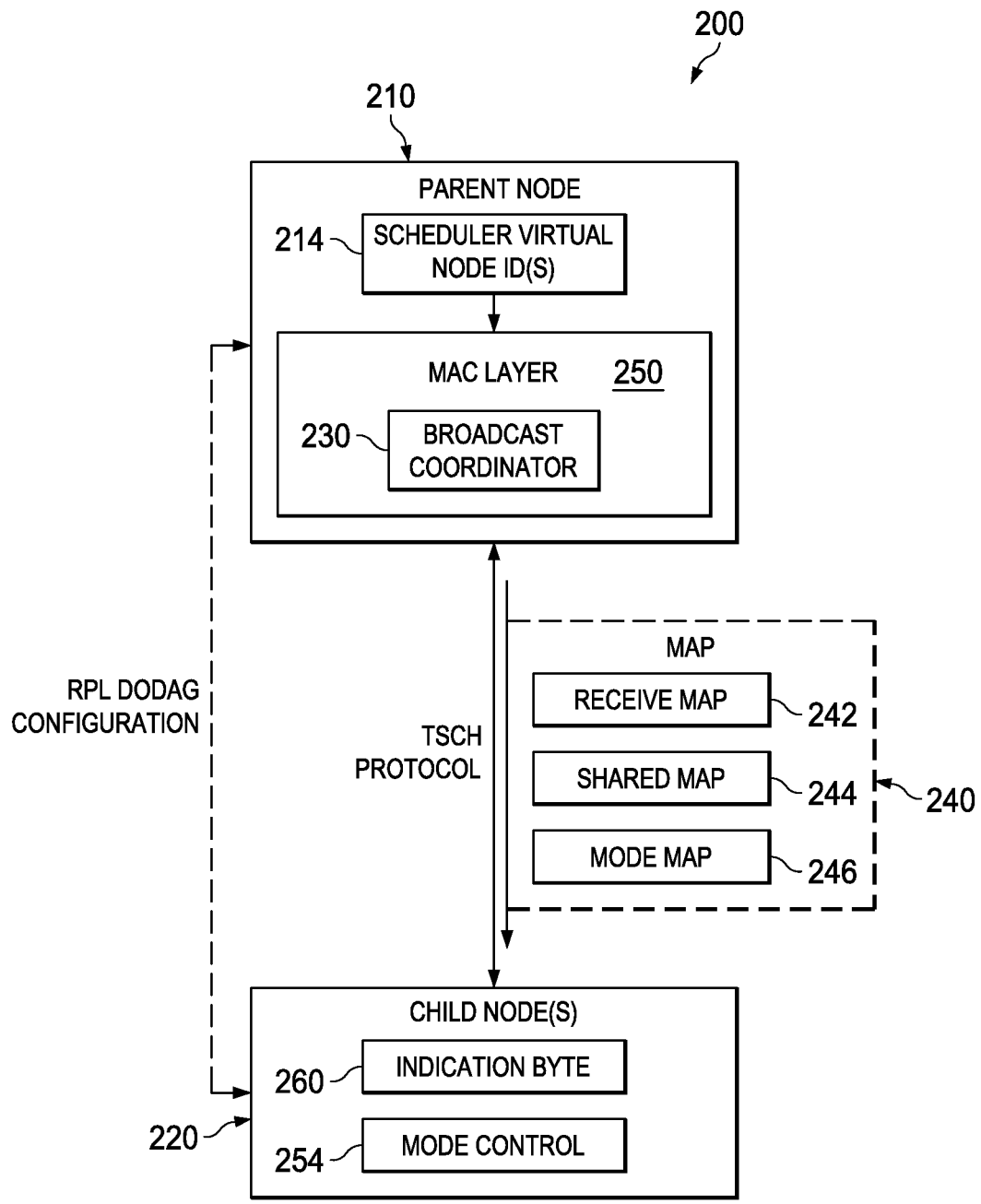
FIG. 2 illustrates an example system that includes a parent node that employs a scheduler to control power consumption of a child node.

FIG. 2 illustrates an example system 200 that includes a parent node 210 that employs a scheduler 214 to control power consumption of a child node 220. The parent node 210 communicates with at least one child node 220 that is configured to communicate with the parent node via a wireless network protocol. The parent node 210 includes a broadcast coordinator 230 to transmit a broadcast message from the parent node to the child node 220 at predetermined time intervals according to the wireless network protocol. The scheduler 214 generates a scheduling packet that is communicated in (or along with) the broadcast message. The scheduling packet includes a map 240 to instruct each child node 220 to activate and receive data communicated from the parent node in a prescribed time slot following the broadcast message that is defined by the scheduling packet. The scheduling packet includes at least one virtual node identifier determined by the scheduler 214 to identify the child node 220 within the map. The virtual node identifier is assigned to the child node 220 by the parent node 210 when the child node joins the network.

The communications between parent and child nodes can occur according to a network routing protocol such as time slotted channel hopping protocol (THSC), for example. A Routing for Low Power Networks (RPL) protocol can be employed in conjunction with the THSC to configure the network topology of parent and child nodes, for example. As noted previously, the parent node 210 can be a root node or an intermediate node and the child node 220 can be a leaf node to the root node or the intermediate node. If RPL protocol is employed, the network of parent and child nodes can be formed as destination oriented directed acyclic graph (DODAG) configuration, where the DODAG consists of at least one root node and at least one leaf node for the network.

The broadcast message can be a beacon that is periodically transmitted by the broadcast coordinator 230 of the parent node 210. As shown, the broadcast message can be transmitted from a media access control (MAC) layer 250 of the broadcast coordinator 230. The MAC layer 250 enables the transmission of MAC frames through the use of a physical channel. Besides its data service, it offers a management interface (not shown) and manages access to the physical channel and network beaconing. It also controls frame validation, guarantees time slots, and handles node associations, for example.

The map 240 of child nodes includes at least one of a receive map 242 to enable or disable a receive time slot in at least one of the child nodes 220, a shared map 244 to enable or disable a shared time slot in at least one of the child nodes, and a mode map 246 to enable or disable a selected mode of operation in at least one of the child nodes. The mode of operation specified by the mode map can be processed by a mode control 254 in the child node 220 to change the mode of operation of the child node based on specifications in the mode map 246. The mode of operation specified by the mode map 246 includes a normal mode to indicate to the child node 220 to utilize a dedicated receiver and transmitter slot assigned to the child node for communications with the parent node. The mode of operation specified by the mode map 246 can include an over the air programming mode to indicate to the child node 220 to utilize contiguous time slots for communications with the parent node. Such mode can allow for more data to be exchanged between parent and child per a given time frame, for example. In another example, the mode of operation map in the mode map 246 can specify a high bandwidth mode to indicate to the child node 220 to send data at a higher data rate to the parent node (e.g., at a higher data rate within a given transmit slot for the child node). In some cases, the child node 220 can transmit an indication byte 260 during a present time frame to indicate to the parent node that the child node will transmit data in at least one future time frame relative to the present time frame.

The following FIGS. 3 through 7 are provided to illustrate various network configurations and bit map examples.

Figure 3:
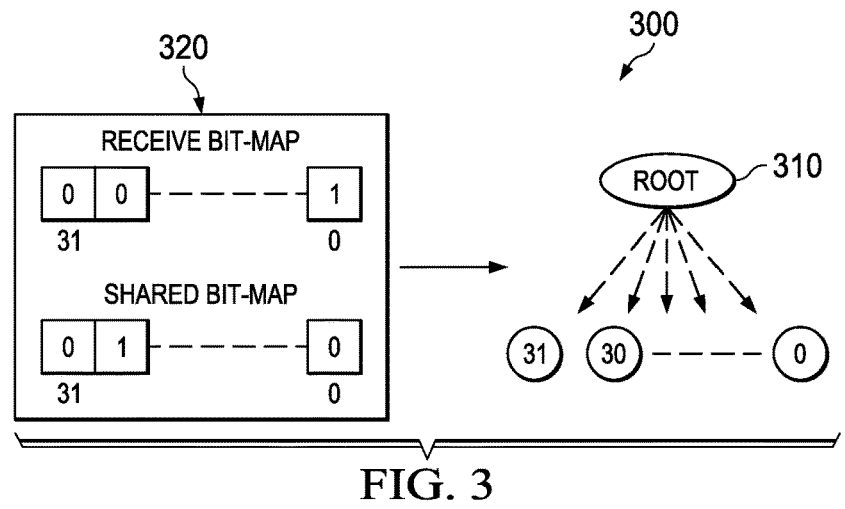
FIG. 3 illustrates an example network configuration and map that can be employed to control power consumption of a child node.

FIG. 3 illustrates an example network configuration and map that can be employed to control power consumption of a child node. This includes a root node 310 (also referred to as parent node) that communicates to 31 different child nodes 0-31 which can also be referred to as leaf nodes. A scheduler (not shown) in the root node 310 can dynamically coordinate the activity of nodes as well as perform mode changes in a media access control (MAC) protocol operation, for example. The scheduler employs a map 320 to control receive and shared slots separately.

The bit position within the map 320 corresponds to a virtual node identifier (ID). The virtual node ID can be maintained by the parent node and it depends on the time of joining of the child node. Hence, the virtual node IDs can be based on the child joining time order, for example. The virtual node ID can be sent as part of the association process by the parent node in the association response packet such as when an RPL DODAG is being created. The bit in the corresponding virtual node ID position of the map 320 determines if that node will be receiving a packet. For example, a logic one in the receive map indicates a packet will be transmitted in the assigned receive slot for the respective child node. Similarly, a one in the shared map indicates a packet will be transmitted in the assigned share slot.

There could be different modes of operations required as previously described. For instance, during normal operation, the assigned slots can be utilized as specified. However, during another mode such as when "over-the-air programming" is employed, all or some nodes may need to be in receive mode continuously where consecutive slots may need to be assigned and made receiver slots for those nodes. Such mode changes can be indicated by an additional set of bits in the beacon packet (within or along with the maps). The number of bits can depend on the number of modes, for example. Additionally pre-determined slot assignments can be made to be used for certain modes of operation.

To consider an uplink data transfer from child to parent, that is for a leaf to indicate to root/intermediate or intermediate to root, a special indication byte can be sent along with data or in RPL messages, for example. However, it may be the case that the parent receiver slot has already passed or will arrive within the same TSCH frame. To facilitate deterministic behavior, the packet that should be transmitted in the next TSCH frame from the one in which the indication byte was sent. The indication byte should be non-zero and can indicate the relative number of slot frames in which the uplink packet will be sent from the one in which the indication byte was sent. If the indication byte is zero, then there is no packet to be received by the parent from the child node and thus the parent can disable its respective receiver resources during that period to conserve power.

Figure 4:
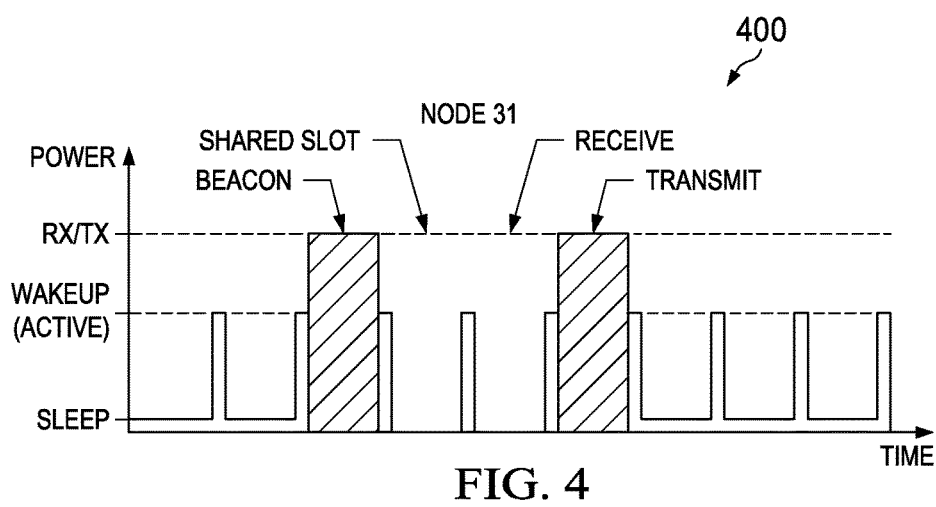
FIG. 4 illustrates an example power diagram for a given child node that is controlled by the map illustrated in FIG. 3.
Figure 5:
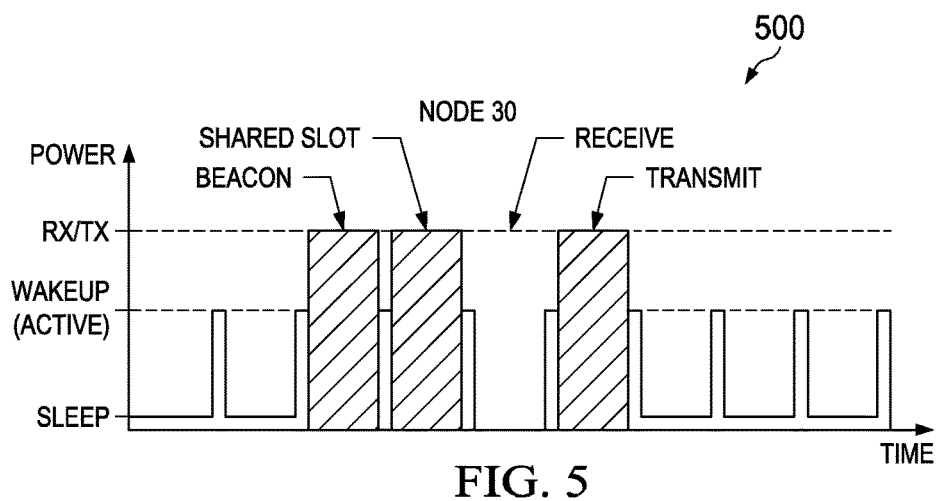
FIG. 5 illustrates an example power diagram for another child node that is controlled by the map illustrated in FIG. 3.

As shown in this example, bits for a node 31 are both zero in the map 320 indicating that the associated child node assigned virtual node ID 31 should disable its receiver during its respective receive and shared time slots. FIG. 4 illustrates an example power diagram 400 for a given child node 31 that is controlled by the map 320 illustrated in FIG. 3. Child node power is illustrated on the vertical axis versus time on the horizontal axis. As shown, no power is generated during the times for the received and shared slots of the child nodes as specified by the map 320 of FIG. 3. FIG. 5 illustrates an example power diagram 500 for another child node 30 that is controlled by the map illustrated in FIG. 3. For the child node 30, a logic one is set for the respective shared slot in the map 320. Thus, as shown at 500, power for the shared slot is generated in the diagram 500 yet the receiver slot is still disabled since the map 320 specifies a logic zero for the receiver slot of node 30.

Figure 6:
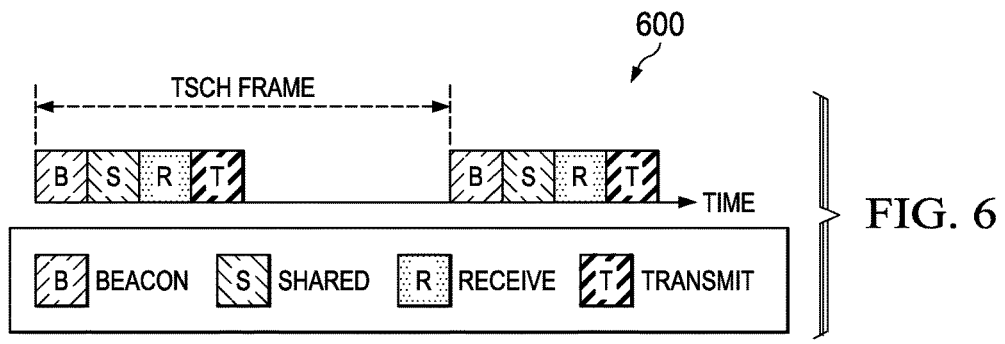
FIG. 6 illustrates an example frame transmission diagram for a time slotted channel hopping protocol.

FIG. 6 illustrates an example frame transmission diagram 600 for a time slotted channel hopping protocol. In this example, an example TSCH frame is illustrated. Each frame can have a dedicated beacon (B) slot, a shared slot (S) which can be utilized by any network node during that time slot, a receive slot (R) and transmit slot (T), where each node is assigned a dedicated receive and transmit slot upon joining the network. As described herein, receiver resources can be shutdown during the shared and receiver slots depending on the map settings as described herein. The transmitter slot of the child can also be unused if the child has no data to send to the parent. As noted previously, the child node can communicate an indication byte as part of a network message to indicate that transmit communications will occur at a future frame with the parent node.

Figure 7:
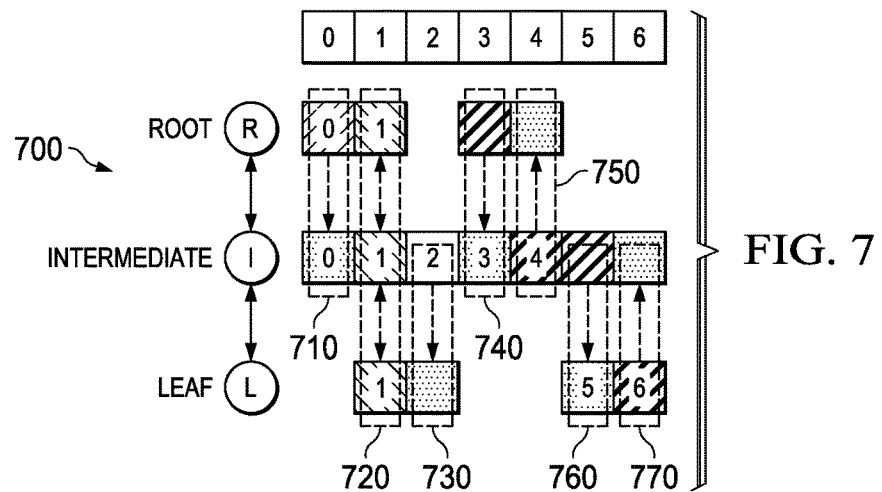
FIG. 7 illustrates an example network configuration diagram where various time slot communications between nodes are illustrated.

FIG. 7 illustrates an example network configuration diagram 700 where various time slot communications between nodes are illustrated. The network configuration 700 includes one root node, one intermediate node, and two child or leaf nodes. At 710, and during timeslot 0, a beacon is transmitted between the root node and intermediate node. At 720, and during slot 1, a shared time slot is shown. In this time slot, any node can receive or transmit. At 730 and during slot 2, the intermediate node transmits a beacon to a child node. At 740 during slot 3, the root node transmits data to the intermediate node and at 750, during slot 4, the intermediate node transmits data to the root node. At 760, during slot 5, the intermediate node transmits data to another child node during the child node's respective receiver slot. At 770 during slot 6, the intermediate node receives data from the child node during the child nodes respective transmitter slot.

Figure 8:
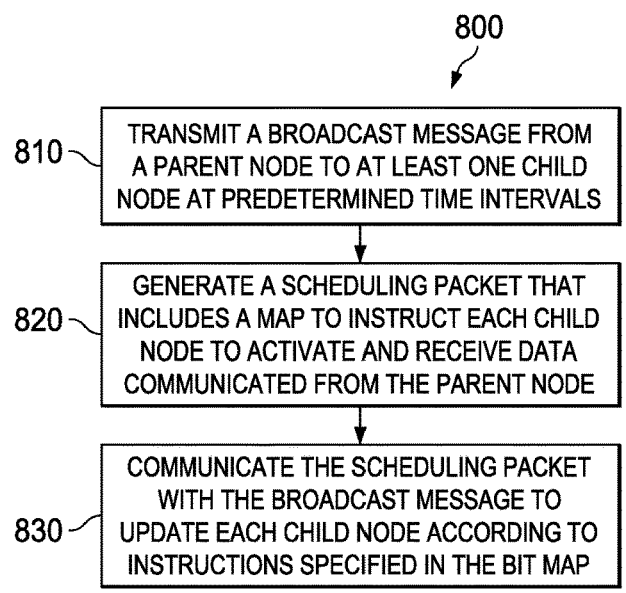
FIG. 8 illustrates an example method to control power consumption of a child node.

In view of the foregoing structural and functional features described above, an example method will be better appreciated with reference to FIG. 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a processor, for example.

FIG. 8 illustrates an example method 800 to control power consumption of a child node. At 810, the method 800 includes transmitting a broadcast message from a parent node to at least one child node at predetermined time intervals according to a wireless network protocol (e.g., via broadcast coordinator 140 of FIG. 1). At 820, the method 800 includes generating a scheduling packet that includes a map to instruct each child node to activate and receive data communicated from the parent node in a prescribed time slot following the broadcast message that is defined by the scheduling packet (e.g., via scheduler 114 of FIG. 1). At 830, the method 800 includes communicating the scheduling packet with the broadcast message to update each child node according to instructions specified in the map (e.g., via broadcast coordinator 140 of FIG. 1). The method 800 can also include transmitting the broadcast message via a beacon that is periodically transmitted by the parent node. This includes transmitting the broadcast message from a media access control layer utilizing a time slotted channel hopping protocol as the wireless network protocol. The data field of the scheduling packet can include at least one virtual node identifier to identify the at least one child node within a map of child nodes, the at least one virtual node identifier assigned to the at least one child node by the parent node when the child node joins the network.

The map of child nodes can include at least one of a receive map to enable or disable a receive time slot in at least one of the child nodes, a shared map to enable or disable a shared time slot in at least one of the child nodes, and a mode map to enable or disable a selected mode of operation in at least one of the child nodes. The mode of operation specified by the mode map can include an over the air programming mode to indicate to the at least one child node to utilize contiguous time slots for communications with the parent node. The method 800 can also include transmitting an indication byte during a present time frame from the at least one child node to indicate to the parent node that the child node will transmit data in at least one future time frame relative to the present time frame.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A network comprising:
   a parent node;
   an intermediate node configured to communicate with the parent node using a wireless network protocol; and
   at least one child node configured to communicate with the parent node via the intermediate node using the wireless network protocol;
   the parent node comprising:
   a broadcast coordinator to transmit a broadcast message from the parent node to the at least one child node through the intermediate node at predetermined time intervals according to the wireless network protocol; and
   a scheduler to generate a scheduling packet that is communicated in the broadcast message, the scheduling packet includes a data field to instruct each child node to activate and receive data communicated from the parent node in a prescribed time slot following the broadcast message;
   wherein the at least one child node includes a first child node that transmits an indication byte during a present time frame to indicate to the parent node whether the first child node will transmit additional data in a future time frame relative to the present time frame, wherein the indication byte contains a non-zero value to indicate that the first child node will transmit additional data in a future time frame and the non-zero value indicates a number of frames between the present time frame and the future time frame in which the additional data will be transmitted by the first child node.

2. The network of claim 1, wherein the broadcast message is a beacon that is periodically transmitted by the broadcast coordinator of the parent node.

3. The network of claim 2, wherein the broadcast message is transmitted from a media access control layer of the broadcast coordinator utilizing a time slotted channel hopping protocol as the wireless network protocol.

4. The network of claim 1, wherein the parent node, the intermediate node, and the at least one child node are configured as a destination oriented directed acyclic graph (DODAG) utilizing a routing for low power network protocol via the wireless network protocol.

5. The network of claim 4, wherein the parent node is a root node of the DODAG.

6. The network of claim 1, wherein the data field of the scheduling packet includes at least one virtual node identifier to identify the at least one child node within a map of child nodes, the at least one virtual node identifier assigned to the at least one child node by the parent node when the child node joins the network.

7. The network of claim 6, wherein the map of child nodes includes at least one of a receive map to enable or disable a receive time slot in at least one of the child nodes, a shared map to enable or disable a shared time slot in at least one of the child nodes, and a mode map to enable or disable a selected mode of operation in at least one of the child nodes.

8. The network of claim 7, wherein the selected mode of operation specified by the mode map includes a normal mode to indicate to the at least one child node to utilize a dedicated receiver and transmitter slot assigned to the at least one child node for communications with the parent node.

9. The network of claim 7, wherein the selected mode of operation specified by the mode map includes an over the air programming mode to indicate to the at least one child node to utilize contiguous time slots for communications with the parent node.

10. The network of claim 7, wherein the selected mode of operation a high bandwidth mode to indicate to the at least one child node to send data at a higher data rate to the parent node.

11. The network of claim 1, wherein the indicate byte contains a zero value to indicate that the first child will not transmit additional data in a future time frame.

12. A method comprising:
transmitting a broadcast message from a parent node to at least one child node via an intermediate node at predetermined time intervals according to a wireless network protocol;
generating a scheduling packet that includes a map to instruct each child node to activate and receive data communicated from the parent node in a prescribed time slot following the broadcast message that is defined by the scheduling packet;
communicating the scheduling packet with the broadcast message to update each child node according to instructions specified in the map; and
receiving an indication byte transmitted by a first child node of the at least one child node, the indication byte being transmitted by the first child node during a present time frame to indicate to the parent node whether the child node will transmit additional data in a future time frame relative to the present time frame;
wherein the indication byte contains a non-zero value to indicate that the first child node will transmit additional data in a future time frame and the non-zero value indicates a number of frames between the present time frame and the future time frame in which the additional data will be transmitted by the first child node.

13. The method of claim 12, further comprising transmitting the broadcast message via a beacon that is periodically transmitted by the parent node.

14. The method of claim 13, further comprising transmitting the broadcast message from a media access control layer utilizing a time slotted channel hopping protocol as the wireless network protocol.

15. The method of claim 12, wherein a data field of the scheduling packet includes at least one virtual node identifier to identify the at least one child node within a map of child nodes, the at least one virtual node identifier assigned to the at least one child node by the parent node when the child node joins the network.

16. The method of claim 15, wherein the map of child nodes includes at least one of a receive map to enable or disable a receive time slot in at least one of the child nodes, a shared map to enable or disable a shared time slot in at least one of the child nodes, and a mode map to enable or disable a selected mode of operation in at least one of the child nodes.

17. The method of claim 16, wherein the selected mode of operation specified by the mode map includes an over the air programming mode to indicate to the at least one child node to utilize contiguous time slots for communications with the parent node.

18. The method of claim 12, wherein the indicate byte contains a zero value to indicate that the first child will not transmit additional data in a future time frame.

19. A system comprising:
a parent node;
an intermediate node configured to communicate with the parent node using a wireless network protocol; and
at least one child node configured to communicate with the parent node via the intermediate node using the wireless network protocol;
the parent node comprising:
a broadcast coordinator to transmit a broadcast message from the parent node to the at least one child node through the intermediate node at predetermined time intervals according to the wireless network protocol; and
a scheduler to generate a scheduling packet that is communicated in the broadcast message, the scheduling packet includes a map to instruct each child node to activate and receive data communicated from the parent node in a prescribed time slot following the broadcast message, the scheduling packet includes at least one virtual node identifier to identify the at least one child node within the map, the at least one virtual node identifier assigned to the at least one child node by the parent node when the child node joins the network;
wherein the at least one child node includes a first child node that transmits an indication byte during a present time frame to indicate to the parent node whether the first child node will transmit additional data in a future time frame relative to the present time frame, wherein the indication byte contains a non-zero value to indicate that the first child node will transmit additional data in a future time frame and the non-zero value indicates a number of frames between the present time frame and the future time frame in which the additional data will be transmitted by the first child node.

20. The system of claim 19, wherein the indicate byte contains a zero value to indicate that the first child will not transmit additional data in a future time frame.

* * * * *